(12) United States Patent
Dvir et al.

(10) Patent No.: US 10,943,114 B2
(45) Date of Patent: Mar. 9, 2021

(54) METHOD FOR AERIAL IMAGERY ACQUISITION AND ANALYSIS

(71) Applicant: AGROWING LTD., Rishon LeZion (IL)

(72) Inventors: Ira Dvir, Rishon LeZion (IL); Nitzan Rabinowitz Batz, Rosh Ha'ayin (IL)

(*) Notice: Subject to any disclaimer, the term of this patent is extended or adjusted under 35 U.S.C. 154(b) by 69 days.

(21) Appl. No.: 15/774,287

(22) PCT Filed: Nov. 8, 2016

(86) PCT No.: PCT/IL2016/051205
§ 371 (c)(1),
(2) Date: May 8, 2018

(87) PCT Pub. No.: WO2017/077543
PCT Pub. Date: May 11, 2017

(65) Prior Publication Data
US 2019/0073534 A1   Mar. 7, 2019

Related U.S. Application Data

(60) Provisional application No. 62/252,513, filed on Nov. 8, 2015.

(51) Int. Cl.
*G06K 9/00* (2006.01)
*G06K 9/46* (2006.01)
(Continued)

(52) U.S. Cl.
CPC ........... *G06K 9/00657* (2013.01); *G06K 9/00* (2013.01); *G06K 9/00624* (2013.01);
(Continued)

(58) Field of Classification Search
CPC .... G06K 9/00657; G06K 9/2018; G06K 9/52; G06T 2207/10036; G06T 7/90;
(Continued)

(56) References Cited

U.S. PATENT DOCUMENTS 6,178,253 B1   1/2001   Hendrickson et al.
6,567,537 B1   5/2003   Anderson
(Continued)

FOREIGN PATENT DOCUMENTS

WO   WO2014147041 A1   9/2014
WO   WO2014147043 A1   9/2014

*Primary Examiner* — Jaime M Holliday

(57) ABSTRACT

A method and system for multi-spectral imagery acquisition and analysis, the method including capturing preliminary multi-spectral aerial images according to pre-defined survey parameters at a pre-selected resolution, automatically performing preliminary analysis on site or location in the field using large scale blob partitioning of the captured images in real or near real time, detecting irregularities within the pre-defined survey parameters and providing an output corresponding thereto, and determining, from the preliminary analysis output, whether to perform a second stage of image acquisition and analysis at a higher resolution than the pre-selected resolution. The invention also includes a method for analysis and object identification including analyzing high resolution multi-spectral images according to pre-defined object parameters, when parameters within the pre-defined object parameters are found, performing blob partitioning on the images containing such parameters to identify blobs, and comparing objects confined to those blobs to pre-defined reference parameters to identify objects having the pre-defined object parameters.

26 Claims, 15 Drawing Sheets

(51) Int. Cl.
*G06T 7/00* (2017.01)
*H04W 4/18* (2009.01)
*G01J 3/28* (2006.01)

(52) U.S. Cl.
CPC .......... *G06K 9/4652* (2013.01); *G06T 7/0012* (2013.01); *H04W 4/185* (2013.01); *G01J 2003/2826* (2013.01); *G06K 2009/00644* (2013.01); *G06T 2207/10036* (2013.01); *G06T 2207/30188* (2013.01)

(58) Field of Classification Search
CPC ............... G06T 7/0002; G06T 7/0004; G06T 2207/10024; G06T 2207/30108; G06T 2207/30188; G06T 5/50; G06T 7/0012; G06T 7/40; G01J 3/2803; G01J 3/2823; G01J 1/4204; H04N 5/332; B64C 2201/021; B64C 2201/042; B64C 2201/104; B64C 2201/127; B64C 2201/165; B64C 39/024; B64D 47/08; C05C 11/00; G01N 2021/1797; G01N 21/17; G06Q 50/02
See application file for complete search history.

(56) References Cited

U.S. PATENT DOCUMENTS

| | | |
|---|---|---|
| 2001/0016053 A1 | 8/2001 | Dickson et al. |
| 2006/0043296 A1* | 3/2006 | Mian ................. G01J 1/42 250/330 |
| 2014/0312165 A1 | 10/2014 | Mkrtchyan |
| 2015/0186727 A1 | 7/2015 | Ma et al. |
| 2015/0254800 A1 | 9/2015 | Johnson et al. |
| 2015/0347872 A1* | 12/2015 | Taylor ................. G06K 9/3233 382/224 |
| 2017/0053169 A1* | 2/2017 | Cuban .................. H04N 7/185 |

* cited by examiner

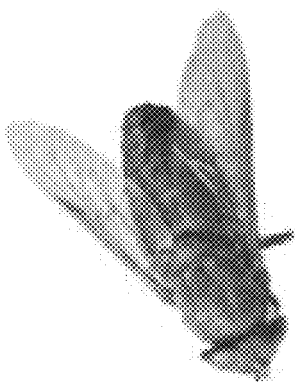 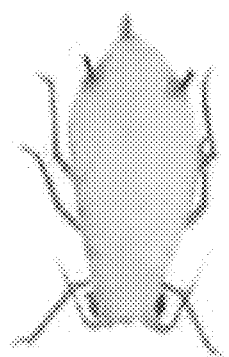 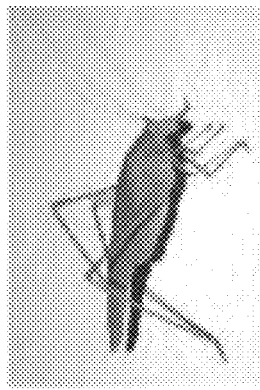
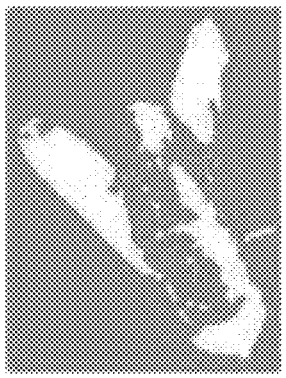 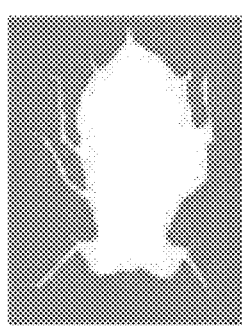 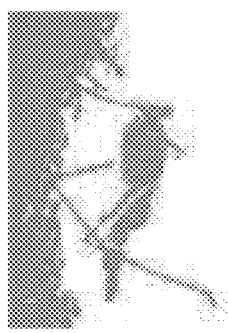
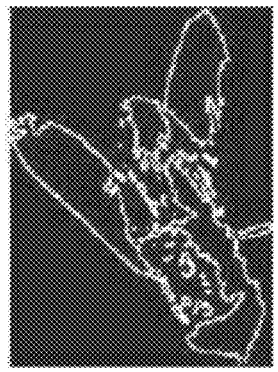 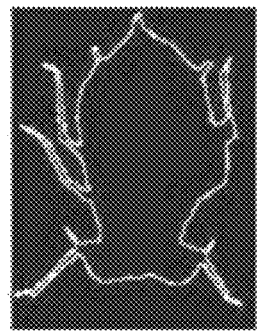 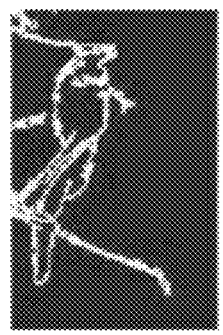
FIG. 7a
FIG. 7b
FIG. 7c

METHOD FOR AERIAL IMAGERY ACQUISITION AND ANALYSIS

RELATED APPLICATIONS

This application is a National Phase Application of PCT Patent Application No. PCT/IL2016/051205, filed on 8 Nov. 2016, which claims the benefit of U.S. Provisional Patent Application 62/252,513 filed on Nov. 8, 2015. The above application is incorporated herein by reference as if fully set forth in its entirety.

FIELD OF THE INVENTION

The present invention relates to image acquisition and analysis, in general and, in particular, to aerial imagery acquisition and analysis.

BACKGROUND OF THE INVENTION

Aerial remote sensing has been developing rapidly over the last decades. Remote sensing is being used for various purposes, among which are agricultural and other environmental monitoring purposes. With the rapid development of light aerial vehicles, such as drones, hovercraft and many other types of UAVs, in addition to the affordable cost of ultra-light and light manned aerial vehicles, remote sensing, including image acquisition, is developing and accessible even to small scale organizations and farmers.

Aerial vehicles can be controlled and managed remotely. When flying over a city or a field, images can be captured for remote sensing purposes. The flight mission of unmanned aerial vehicles, just like manned ones equipped with an automatic pilot, can be pre-planned for specific routes according to the mission purposes, and also altered in real time, if required.

NDVI (Normalized Difference of Vegetation Index) software and tools, which are the main vehicle for agricultural remote sensing measurement, like many remote sensing tools for other purposes, assist organizations and farmers in monitoring the environment and fields/crops status. The NDVI vegetation index (Normalized Difference Vegetation Index) measure can be used to analyze remote sensing measurements, typically but not necessarily from a space platform or an aerial vehicle, and assess whether the target being observed contains live green vegetation or not. NDVI and other multi-spectral and hyper-spectral analysis tools, when used properly and based on the right image acquisition equipment, can indicate, for example, the presence of jellyfish swarms and sardine flocks in the sea, military mines in shallow ground, the presence of metal objects on the ground, the stress and vigor of vegetation, dry/wet areas, forestry health and diseases, the presence of pests and livestock, and so on. The resulting output of NDVI analysis and similar tools can be presented as a simple graphical indicator (for example, a bitmap image).

However, the analysis of NDVI and all other tools is usually done off-line (following the drone/airplane/satellite's acquisition) and the resulting image or set of images (orthophotos), which present different areas of the image in various colors, are presented to the farmer/user after a significant delay. In addition, for an average person/farmer, the output images of these tools are not of much value, as he is usually not an expert, and is unable to perform the necessary analyses in order to fully understand what is presented in the bitmap. Furthermore, in most cases based on the analyses results, the user is sent to the field for a closer look, in order to find the exact nature of the irregularities which were indicated. There are services which analyze the images and send a report to the farmer, but usually these reports are prepared by a human expert, who examines the images in a similar way that a physician examines an X-Ray radiograph, and such analyses are sent a day or a few days after the acquisition of the imagery, and as stated above, require in many cases additional and more detailed exploration.

A typical agricultural use of remote sensing can serve as a good example of such a need. If a farmer wants to have a survey in order to detect, in a timely manner, the presence of white fly or aphids in his crops, and the size of both white fly and aphids could be of 1 mm-2 mm only, it is clear that one cannot screen every inch of the crops searching for them. However, there could be changes, which are evident in lower resolution imagery (visual, hyper-spectral or multi-spectral images), which indicate that a certain area of a field could be infected with some unidentified pests or diseases. Unfortunately, the best satellite imagery (like GeoEye-1) is of 1 pixel per 40 cm, which is far from sufficient for early detection of such pests. Aerial drone imaging, shooting, for example, with a 25 mm lens three meters above the ground can cover a rectangular area of 1.6×2.4 m (3.84 square meters). Using a 10 Mega Pixels camera, this means 26 pixels per square cm. Such detailed imagery could allow the identification of whitefly, but acquiring images of hundreds of acres at such resolution will require excessive resources, and will turn the process into an impractical one.

Accordingly, there is a need for an intelligent method for automatic analysis and a decision support system, which will allow not only for better remote sensing, but will provide the end user (organizations/farmers) with immediate or short term analysis results and advice, as in many cases delayed advice could be useless, and the damage of a late analysis could be irreversible.

There are known image processing computer programs for analyzing acquired images of an object of unknown shape and comparing them to shapes in a database in order to identify the object. The image classification method based on a deep neural network approach is one of the most commonly used methods for this purpose.

In computer image analysis, blob detection methods are known for detecting regions in a digital image that differ in properties, such as brightness or color, compared to surrounding regions. Informally, a blob is a region of an image in which some properties are constant or approximately constant; all the points in a blob can be considered in some sense to be similar to each other. In the blob partitioning methodology, each digital image is comprised of grey level brightness, that is to say 256 levels of brightness. Each pixel in the image is associated with one of these levels. The blob partitioning approach groups adjacent pixels of the same brightness and represents them on a display as a discrete object or blob. That is to say, that the size of each blob is defined by the number of included pixels.

SUMMARY OF THE INVENTION

There is provided according to the present invention a method for automatic analysis and a decision support system permitting acquisition and analysis of multi-spectral image data, preferably in real or near real time. In particular, the method includes an initial image acquisition and blob partitioning on a large scale, amounting to hundreds up to thousands of pixels per blob, for an initial analysis, in order to determine whether to proceed with a second image acquisition and blob partitioning on a small scale, grouping tens of pixels per blob, according to selected criteria in order to investigate irregularities in the initial images.

There is provided, according to the invention, a method for multi-spectral imagery acquisition and analysis, the method including capturing preliminary multi-spectral aerial images according to pre-defined survey parameters at a pre-selected resolution, automatically performing preliminary analysis on site or location in the field using large scale blob partitioning of the captured images in real or near real time, detecting irregularities within the pre-defined survey parameters and providing an output corresponding thereto, and determining, from the preliminary analysis output, whether to perform a second stage of image acquisition and analysis at a higher resolution than the pre-selected resolution.

According to embodiments of the invention, the method further includes associating GPS data with the detected irregularities, directing an image acquisition device, in real time or near real time, to capture additional images of at least one of the detected irregularities at higher resolution than the pre-selected resolution using the associated GPS data, and performing analysis using small scale blob partitioning of the captured images in real or near real time.

There is further provided, according to the invention, a system for multi-spectral imagery acquisition and analysis, the system including at least one multi-spectral image capturing device, a processor coupled to the image capturing device, the processor running an image processing module including a blob partitioning module to automatically analyze captured images by blob partitioning according to predefined survey parameters and provide output corresponding to irregularities on each image falling within said predefined survey parameters, wherein the blob partitioning module is capable of implementing both large scale blob partitioning and small scale blob partitioning, and a geographical location indicator adapted and configured to provide an indication of a geographical location of the irregularities, the processor being configured to automatically determine whether to direct one of the multi-spectral image capturing devices to the indicated geographical location to capture images of the irregularities in response to the output.

There is also provided, according to the invention, a method for analysis and object identification including analyzing high resolution multi-spectral images according to pre-defined object parameters, when parameters within the pre-defined object parameters are found, performing blob partitioning on the images containing such parameters to identify blobs, and comparing objects confined to those blobs to pre-defined reference parameters to identify objects having the pre-defined object parameters.

BRIEF DESCRIPTION OF THE DRAWINGS

The present invention will be further understood and appreciated from the following detailed description taken in conjunction with the drawings in which:

FIG. 2b shows pixels associated with selected NDVI values ranging derived from the images of FIG. 2a;

FIGS. 7a, 7b and 7c illustrate an original CMS pest, a binary image resulting from the projection of the pixels of the largest three blobs of the original pest, and resulting boundaries of the pest after processing, respectively;

FIGS. 9b and 9c shows boundaries and calculated corner points of the image of FIG. 9a;

DETAILED DESCRIPTION OF THE INVENTION

Figure 1A:
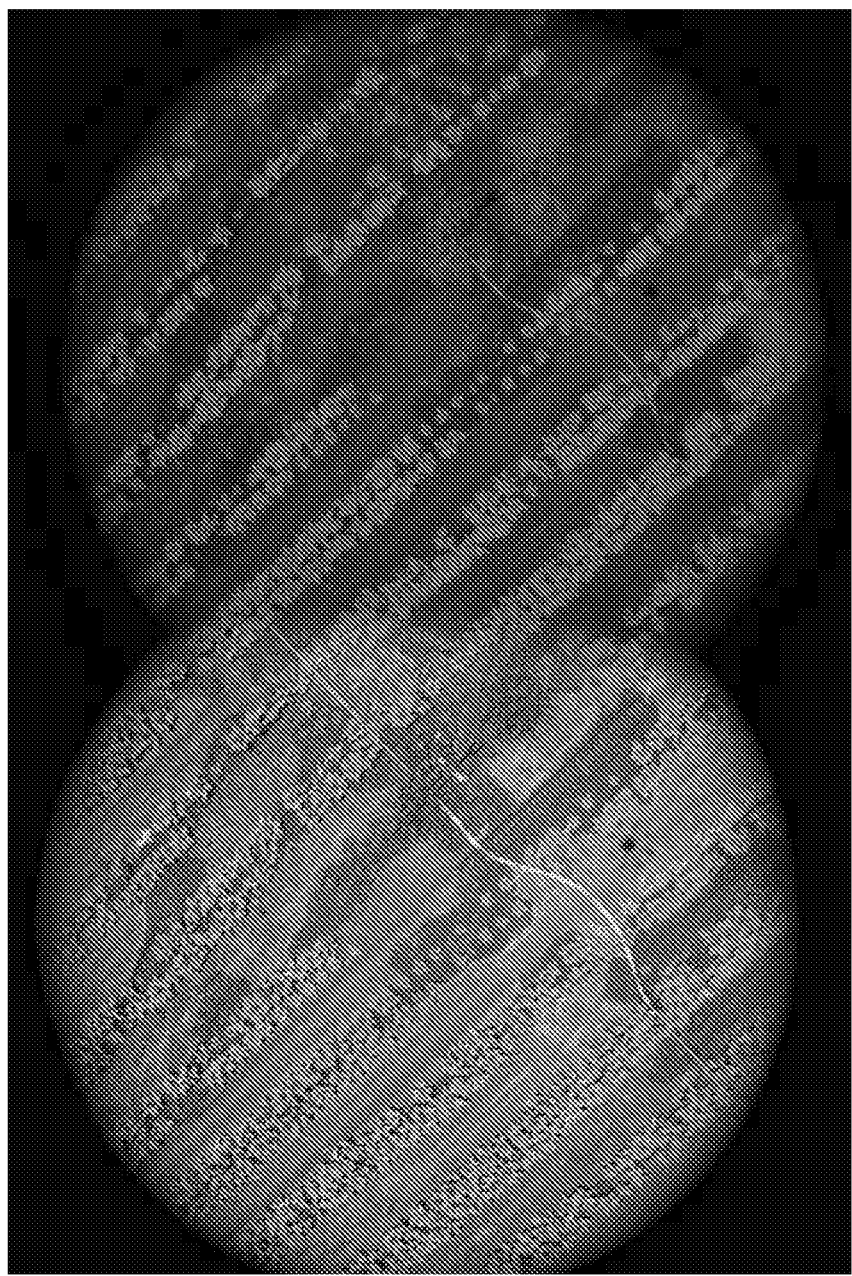
FIG. 1a shows a pair of images shot from a UAV flying above a plantation field using suitable filters to obtain Visible and NIR images of the field in accordance with one embodiment of the present invention.

The present invention provides an inventive method for image acquisition and analysis and a decision support system, which will provide better remote sensing, and provide the end user (organizations/farmers) with enhanced imagery acquisition, analysis results and advice. In particular, the method permits a one- or two-stage acquisition and analysis of multi-spectral imagery, wherein at least the first stage analysis, at low resolution over a large area, is performed in real or near real time. From results of this analysis, a determination is made whether or not to proceed with a second stage of multi-spectral image acquisition and analysis, at high resolution on a smaller area. Analysis can be performed on location, i.e., at the time of acquisition of each image or frame with later addition of geographical indications, or analysis can be performed on a geotagged orthophoto of a larger area. For purposes of the present invention, analysis in near real time, for each acquired image, particularly on location (in the field) analysis, means no more than a few seconds (5 seconds or less) after the acquisition session, and, for creation and analysis of a geotagged orthophoto covering a field of a few tens of hectares or more, near real time means a few minutes (15 minutes or less) following acquisition. Providing a processor on board the aircraft that is capturing the multi-spectral images can allow analysis of the individual captured frames and identification of areas of interest in real time. It is also possible, according to the current invention, to perform such near real time or real time analysis if the captured imagery is transmitted over a wireless network to a processing platform (e.g., computer) on the ground.

According to the invention, analysis of the low resolution images is performed using blob partitioning on a large scale, in order to identify irregularities or regions of interest. The second stage of analysis utilizes blob partitioning on a small scale, when analyzing results of high resolution image acquisition, for example, for pest detection and identification. In particular, the invention utilizes acquisition and analysis of multi-spectral data and not just of images in the visible range. According to some embodiments of the invention, the determination as to whether to perform a second stage of acquisition and analysis is made automatically.

Such an automatic decision support system will analyze the acquired imagery, assisting the management of the acquisition process, and allow acquisition of more detailed imagery of selected geographical areas, based on the initial analysis of the preliminary captured images, thus enabling the examination of points of interest in the surveyed areas at a resolution which is impractical to acquire over a larger area. Among other tasks, an enhanced imagery acquisition is concerned with accurately delineating areas with specific required properties, defined in advance by the person requesting the survey, such as a specific desired range of NDVI values or other measures.

The present invention provides an efficient solution for automatically delineating areas associated with desired NDVI—or other vegetation index based—values or any other selected parameters, by providing a method for additional efficient visual and hyper-spectral or multi-spectral automatic aerial imagery acquisition and analysis. This is accomplished by acquiring the images at a resolution termed "low resolution acquisition", sufficient, during analysis, to allow accurate detection of blobs whose associated values are confined to the required NDVI or other parameter range. This is performed, typically, by automatically searching for blobs indicating vegetation in a state of stress of some kind (for example, as manifested in NDVI values which are on average lower by 15% to 20% than the optimal NDVI value). The stress could indicate various issues regarding vegetation state and health, such as dryness, vigor, pests and diseases.

It will be appreciated that the image acquisition device can be arranged to acquire multi-spectral images across a wide band of the spectrum. Alternatively, or in addition, the image acquisition device can be arranged to acquire images in a plurality of pre-selected bands or color channels, selected according to the objects being sought in the survey. In either case, analysis of the multi-spectral image will be performed utilizing acquired color channels selected according to the objects being sought in the survey.

Preferably, the low resolution acquisition device uses a low distortion camera, preferably using a NADIR gimbal. This enables securing a vertical view, thus minimizing the distortion due to the camera angle. Alternatively, other suitable low resolution acquisition devices can be utilized. Preferably, the image acquisition device is equipped with an automatic digital calibration apparatus, thus enabling the processing of individually captured images, without the need for complex alignment of the color channels, and avoiding the need for pre-processing, such as morphing the images and distortion correction. Examples of suitable image capturing apparatus are described in Applicants' U.S. patent application Ser. No. 62/260,272 filed 26 Nov. 2015.

The current invention allows fast and even real time analysis of the acquired imagery by its unique imagery acquisition and file type. The multi-spectral image acquisition should preferably be carried out using a file type (like JPEG, RAW, TIFF or any other image file format) while the multi-spectral channels (Blue, Green, Red, Red-Edge, NIR—all or some of them) are saved as multiple channels images side by side. This can be performed most efficiently through the use of multiple lenses (as described in the image capturing patent application cited above) using a single sensor divided into separate areas, although the invention is not limited to these examples. Using such a camera (having multiple lenses and a single sensor), the different RGB (Red Green Blue) and NIR (Near InfraRed) channels can be saved separately. Thus, for example, the red channel can be captured on the left side of the sensor, while the near infra-red channel can be captured on the right side of the sensor. Also, different ranges of green and blue can be captured on the different areas of the sensor, while all the channels are then saved in a single file. Such a capturing process allows simple splitting of up to 6 distinctive channels using two lenses with a single sensor. Any side may contain optimally up to three channels of shades of red, green and blue. Such a file structure allows simple and fast channel separation. As the different red types (650 nm or 710 nm) are saved side by side with the 850 nm channel, and the same way one can have different narrow blue and green channels, splitting the channels to RGB and separating the image into two (in case two lenses are used), will produce all the different channels. Such file format can be any standard RGB format file like JPG, BMP, PNG, TIFF etc., whereas these files are limited to 3 bands or 3 bands and a Gamma channel. As important vegetation indices currently in use employ more than two bands to accurately detect blobs of interest (such as ARVI—"Atmospherically Resistance Vegetation Index" which employs Red Blue and NIR bands), such side by side separation is vital for correct identification of blobs of interest.

The present invention utilizes blob detection methods to detect regions in the digital images that differ in properties, such as brightness or color, compared to surrounding regions. Such regions or irregularities indicate possible problem areas that require further investigation. The detection of blobs associated with predefined parameters in the surveyed area guides the second step of the imagery acquisition mission, the high resolution step. Such guidance can be accomplished by associating GPS data with these blobs and directing an image capturing device on a UAV/drone/hovercraft/ultralight, etc., to take additional highly detailed (higher resolution) images of points of interest (irregularities), whether in near-real time, real-time or post processing. Such detailed imagery acquisition can be done by the same aerial vehicle and capturing device, or by the same vehicle using another capturing device, or by another aerial vehicle with a higher resolution capturing device, or by a ground vehicle with a capturing device.

Once highly detailed imagery is acquired (VIS, hyper-spectral or multi-spectral imagery), it is possible to analyze the acquired imagery and assist the farmer in deciding what steps he needs to take, immediately or in the short term, or in the long term. This second stage of analysis is also performed using blob partitioning, typically small scale blob partitioning.

In other words, the current invention applies automatic analysis of first low and then high resolution imagery, in order to produce a fully automatic decision support system utilizing remote sensing devices. Low resolution imagery can be the result of high altitude and/or a low resolution camera and/or short focal length aerial imagery acquisition. Since lower resolution provides less data to process, low resolution scanning is much faster and more efficient. High resolution detailed imagery can be acquired through low altitude acquisition and/or a high resolution camera and/or a long focal length (zoom) or even acquiring the imagery from the ground.

According to the present invention, different methods are used for each step of the image acquisition process, in order to utilize efficiently the image capturing devices, and perform fast and practical scanning of the environment/fields where possible in real time or near real time, while "focusing" in high resolution imagery on blobs of interest and identifying, as accurately as possible, their nature according to the required survey. For agricultural purposes, for example, the current invention implements automatic systematics to identify pests, diseases, and vegetation vigor and other aspects of the crops.

It is important to clarify that blobs of interest are defined in advance, according to the purpose of the particular survey. If, for example, landmines are to be found, then the pixels representing their graphic representation after the suitable analysis (using NDVI or any other vegetation index based metric or pre-selected parameters) will be defined as the interesting pixels. If, for example, cotton canopy is to be found, then the pixels representing the white cotton bolls will be defined as the interesting pixels and blobs.

The first step of one possible embodiment according to the current invention includes aerial acquisition of multi-spectral imagery of rather low resolution. Such low resolution could be of 1 pixel per 100 square centimeters (10 cm×10 cm) or even 1 pixel per square meter, or any other resolution similar to that captured by satellites, which has been proven over the years to be adequate for remote sensing for the required survey. In other words, if, for example, an agricultural survey is focused on cotton canopy, it is already known (as documented in various US DOA publications) that image acquisition can be done from an altitude of a few hundred meters using a 50 mm focal length camera. In such a case, it is known that a multi-spectral camera of four spectral bands (Red; Green; Blue and Near Infra-Red) can acquire the required imagery for NDVI presentation.

The second step of this agricultural remote-sensing example, according to the current invention, includes an analysis, according to NDVI (and/or one of the tools based on it). The resulting values of the analysis can be presented as an image, which presents the areas covered with cotton in one color and those uncovered by cotton in another color. The same principle applies to most agricultural surveys, where dry or unhealthy vegetation or weeds will be "painted" one color and healthy vegetation will appear "painted" another color. These colored pixels are merely representing the results of the analyses in a user-friendly way, and the automatic analysis uses the values, which are attached to these pixels.

The third step, according to the current invention, includes the automatic gathering of the pixels associated with the pre-defined parameters, e.g., NDVI values (or any other agricultural vegetation index metric) during image analysis, into blobs. The creation of such blobs entails a uniform quantization operation that is dependent on the required survey. In some surveys (like whitefly detection), very few pixels cannot be ignored and even small blobs are of significance, while in other surveys (like tuna school detection) only large blobs are of importance. As the NDVI is actually a synthetic image, i.e., each pixel has a calculated value taken from RED and NIR channels, prior to any such blob creation, the NDVI map may undergo an advanced de-noising operation allowing the creation of continuous blobs that optimally preserves important features of the acquired image.

This preliminary analysis is used by the system processor to determine whether a second stage of image acquisition and analysis is required, for example, if irregularities are observed and if their extent or size passes a pre-selected threshold. If not, the survey ends and this information is sent to the person requesting the survey. On the other hand, if it is determined that a second stage is warranted, the processor either automatically proceeds, as describe hereafter, or notifies the person requesting the survey and awaits manual instructions. Alternatively, the analysis of the images after blob partitioning can be accomplished manually (visually by a human being) in order to determine whether to proceed to a second step of acquisition.

In the case of automatic acquisition and analysis, the fourth step includes the attachment of GPS data to the blobs indicating irregularities on which the survey is focused (pest infested fields, water leaks, etc.). The GPS data can be attached to the images in various ways. Some cameras have an embedded GPS sensor integrated with them. In other cases, cameras are operated wirelessly by an operating smartphone (as is the case with Sony's QX1 lens-like camera and Olympus Air A01 camera, which can add the GPS data from the operating smartphone or an autopilot/processing platform attached to the camera). The preferred solution, according to the current invention, due to better accuracy, is to add the GPS data from the aerial vehicle's GPS sensor, which is usually positioned on top of the vehicle and connected to the autopilot, or directly to the camera (if supported by the camera). Synchronizing the capturing time of the imagery and the GPS data is of importance, as aerial vehicles can move fast. It will be appreciated that each frame can have GPS data associated with it, or an orthophoto of a larger area can be geotagged.

Another way, and the most accurate one, is by creating an orthophoto of the acquired images and fitting it to an accurate map. Such matching, although it is slow and demands rather heavy computation, overcomes bias and deviation due to lens distortion, lack of satellite signals, and the angle of the vehicle while acquiring the imagery.

The fifth step, according to the current invention, includes the automatic preparation of highly detailed imagery acquisition of the areas represented by the blobs of interest. The imagery acquisition device (e.g., airborne or ground borne camera), which is preferably a multi-spectral or hyperspectral camera, is sent to the geographical location of these blobs to capture detailed imagery of those locations. Some possible ways to acquire highly detailed imagery are to use a low altitude hover craft or helicopter flying a few feet/meters above the crop or sending a ground robot and/or a human being to acquire the imagery from the closest possible distance. Another method is to use a camera with a longer focal length of zoom. However, this method is quite expensive and inefficient, if hyper-spectral or multi-spectral highly detailed imagery is required. The accuracy of the GPS data is of importance, as such close looks at the blobs of interest could mean, for example, the acquisition of imagery of a 0.8 m×1.2 m rectangle at 10 Mega Pixels, as described above.

It should be noted that in some surveys (like tuna school detection), the GPS data of a blob in a single image may not be sufficient, and a trajectory needs to be predicted based on a number of successive images, with an additional analysis of the GPS data changes of the blobs. Such analysis, calculated with the processing and acquisition time, will allow the system to follow the required blobs of interest, which are not static, and acquire detailed imagery of such blobs at their predicted location.

The sixth step, according to the current invention, includes automatic systematics and identification of the findings. Systematics, or systematic biology, for purposes of the invention, includes, inter alia, describing and providing classifications for the organisms, keys for their identification, and data on their distributions. This step is a rather complex step, and it includes a few sub-steps in itself. It will be appreciated that the automatic systematics and identification of objects described below can be utilized to analyze high resolution imagery captured in any fashion, and not only by means of the automatic image acquisition methods and system described above.

First, the acquired imagery is analyzed according to the survey type. For example, identifying greenfly on green leaves is more difficult than identifying whitefly, if the acquired imagery is of the visual spectrum only. However, adding NIR imagery of greenfly on green leaves removes the aphid's green camouflage, as the greenfly does not reflect the near infrared spectrum in the same way that chlorophyll does.

Second, once the presence of suspected objects (aphids, greenfly, worms, grasshoppers, etc.) is found, fragments of the imagery containing such objects are extracted, typically by drawing rectangular squares centered at a centroid of each fragment, the squares being a few pixels long. Preferably, each fragment contains a single object with minimal background "noise", to allow for better classification and identification. The suspected objects are preferably first classified by utilizing a remote server containing a reference pests data base according to the type of survey. A preferable way to classify the pests/diseases of an agricultural survey, for example, will include the location, crop type, and a reference to a bank of potential pests/diseases, which are relevant to that specific type of crop. However, it is also possible to perform the automatic systematics in the acquisition platform. In this case, the acquisition platform will be equipped with an internal program capable of identifying the pest by comparing it to a small data set of reference pest images residing in the platform processing memory. The seventh step includes the identification of the suspected (and classified, if they were classified in the previous step) objects.

The basic underlying idea for identifying the objects in this step is associated with the claim that proper partitioning of the acquired image into confined size sub-images guarantees, in high probability, that, if the suspected objects are present in the detailed acquired image, they are likely to be found in the confined size sub-images.

The size of the confined size sub-images is set according to the survey type, matching the image size to that of the blobs which are supposed to represent the objects which the survey is focused on. Once a set of such confined size sub-images, which contain blobs, is prepared, the process of identifying the objects within this set of sub-images can be accomplished by either sending the set of these sub-images to a remote server for identification or by identifying the object on the spot by activating a local identification code.

Various image partitioning methods and corresponding detection methods are detailed in this invention. Generally, two types of objects are searched for, objects having simple structure and objects having complex structure. A few specific image partition-based methods are tailored for each type.

The eighth step, according to the current invention, includes sending the results of the analysis to the addressee (the one who ordered the survey or the service provider). The results include the possible identification of the findings and they may also include advice regarding the steps that need to be taken in order to, for example, exterminate a pest or put out a fire or to put a fence and warning signs around old land mines (depending on the survey). The results can be sent with the small fragments of the imagery from the cloud (Internet), or even from the aerial vehicle, for example when the processing platform is a smartphone equipped with a cellular connection (e.g., 3G or LTE). In some possible embodiments of the current invention, the fractions of the imagery, the location and the advice to the user are sent through multimedia messaging service (MMS) or through an instant messaging service (IM), like Messenger, WhatsApp, Skype, etc.

Detailed Description of Some of the Steps in an Exemplary Agricultural Survey

Identification of Areas Associated with Specific NDVI (and Similar Metrics) Values A preferred process will include the following steps:

1. Capturing visual and/or hyper-spectral or multi-spectral imagery from an efficient range (preferably an altitude of a few dozens of meters to a few hundred meters and even more);
2. Analyzing the imagery according to the desired survey (e.g., dryness; vegetation vigor; pests; diseases; etc.);
3. Defining the areas of interest in the images which call for more detailed examination by large scale blob partitioning.
4. Attaching precise GPS data to the areas of interest.
5. Automatically directing the same aerial vehicle or another vehicle with an image capturing device to these areas of interest, directing it to take detailed (higher resolution) imagery according to the survey type. Typically, the criteria directing the platform to perform high resolution acquisition will be the presence of blobs that are associated with NDVI values 10% or 20% lower than the optimal NDVI value—i.e., an indication of "vegetation stress".

The overall goal here is to automatically detect, from an aerial vehicle, from relatively low resolution imagery, areas of interest that are associated with specific NDVI (or some other tool) values. Such areas of interest may typically indicate vegetation stress/vigor, wet areas, areas covered with water, ripe crop, vegetation vigor, etc. As the NDVI (or other vegetation index based) map is actually a synthetic image, it entails an extremely large quantity of noise. Thus, a pre-processing de-noising operation may be performed. In this invention, preferably an advanced de-noising algorithm, that preserves key features of the NDVI image, is employed. (See, for example, "Total Variation Filter", Chambolle 2004). Alternatively, any other suitable de-noising algorithm can be utilized.

Automatic detection of such areas can be carried out by "gathering" into blobs pixels which indicate deviation from the normal values for the required survey (e.g., NDVI or EVI or any similar metric), preferably based on a configurable number of pixels and density.

One possible embodiment of the process using the NDVI metric is as follows:

The input for the calculations is a matrix of NDVI values ranging from −1 to 1, as acquired by a multi-spectral airborne camera. The NIR band and the VIS_RED band are used to produce the NDVI values, using the formula NDVI= (NIR−VIS_RED)/(NIR+VIS_RED). Such NIR and VIS Red bands could be narrow bands of 20 nm to 70 nm, the center of the bands being 650 nm and 850 nm.

In one such possible embodiment of the invention, after having applied an advanced de-noising operation on the NDVI map, blobs having a range of required NDVI values are searched. Pixels associated with required NDVI values are "gathered" to define blobs through the following three step procedure:

Step 1. Assuming the area of interest is associated with a known range of NDVI values, or other predefined parameter values, the algorithm constructs a binary map of the NDVI image, where the relevant pixels associated with the relevant range of NDVI values is set to 1 and the rest of the pixels is set to 0.

Step 2. The set of all possible blobs (clusters) associated with the binary map derived from step 1 is constructed using, for example, a Cluster Labeling algorithm, or another suitable algorithm. This algorithm is based on the "Hoshen Kopelman" cluster labeling algorithm (1975). Basically, the Hoshen Kopelman algorithm that is used in this invention raster scans a binary map and, in one pass, finds all the blobs along the scanning process and assigns them with a running index.

Other techniques for blobs construction, such as various methods for exhausted neighboring pixels search, can also be utilized, although they incur computational load.

Step 3. A decision criterion to define a given group of blobs as an irregularity or an "area of interest, belonging to the required NDVI values" is defined as follows:
1. If the number of pixels belonging to a given single blob exceeds a given threshold parameter.
2. The number of pixels belonging to a set of blobs, all confined to a given radius (from the gravity center of the above set of blobs), exceeds a given threshold.

Figure 1B:
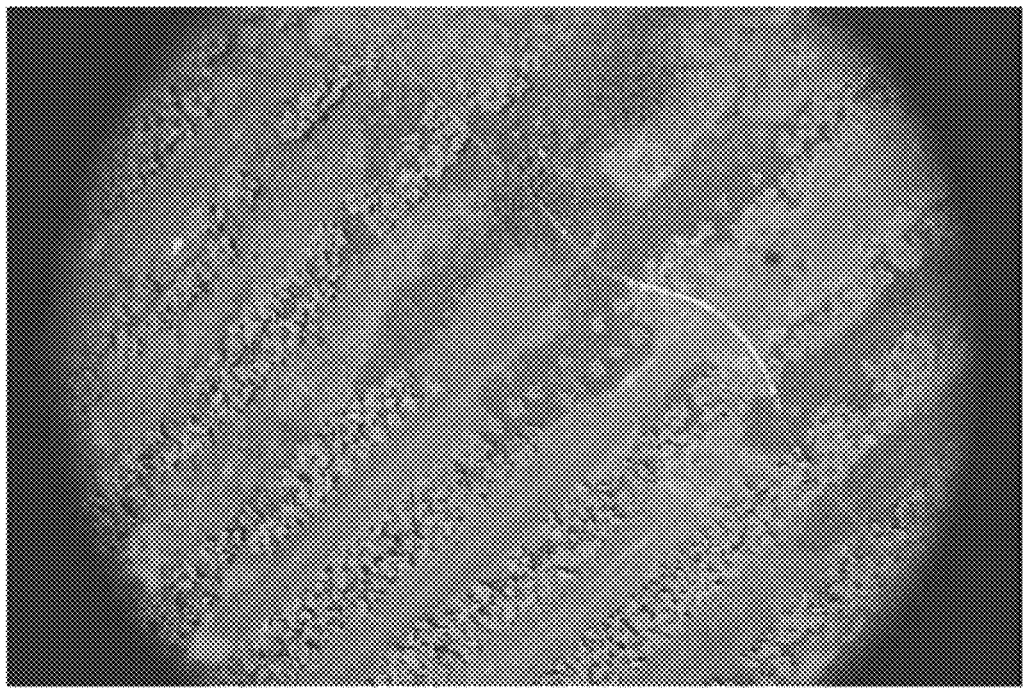
FIG. 1b shows the pixels in FIG. 1a associated with selected NDVI values superimposed on the visible image.
Figure 1B:
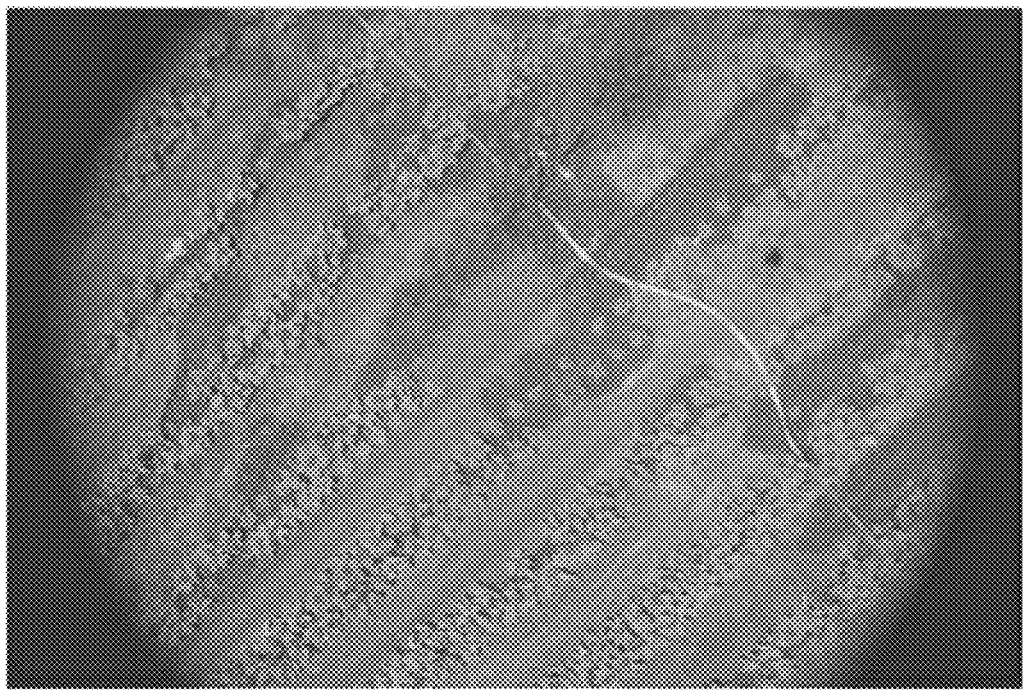
Figure 1C:
FIG. 1c shows the set of largest 34 blobs from FIG. 1b derived from this set of pixels.

FIGS. 1a, 1b and 1c illustrate how the procedure works. FIG. 1a shows a pair of images shot from a UAV flying above a plantation field using suitable filters to obtain Visible and NIR images of the field. FIG. 1b shows the pixels associated with NDVI values ranging from −0.3 to −0.1 (colored in red) (the pre-defined range of interest) superimposed on the visible image. These pixels mark the wet areas in the field. FIG. 1c shows the set of 34 largest blobs (each blob, randomly colored, containing a number of pixels exceeding 200) derived from this set of pixels that was calculated automatically using the algorithm described above.

In another embodiment of this invention, the detection of areas associated with pre-selected NDVI values is carried out by the following procedure.

The binary map of pixels associated with NDVI required values is partitioned into polygons having equal areas, and the density of each polygon is calculated. Polygons having large density are then chosen to represent centers of areas associated with the required NDVI values.

Figure 2A:
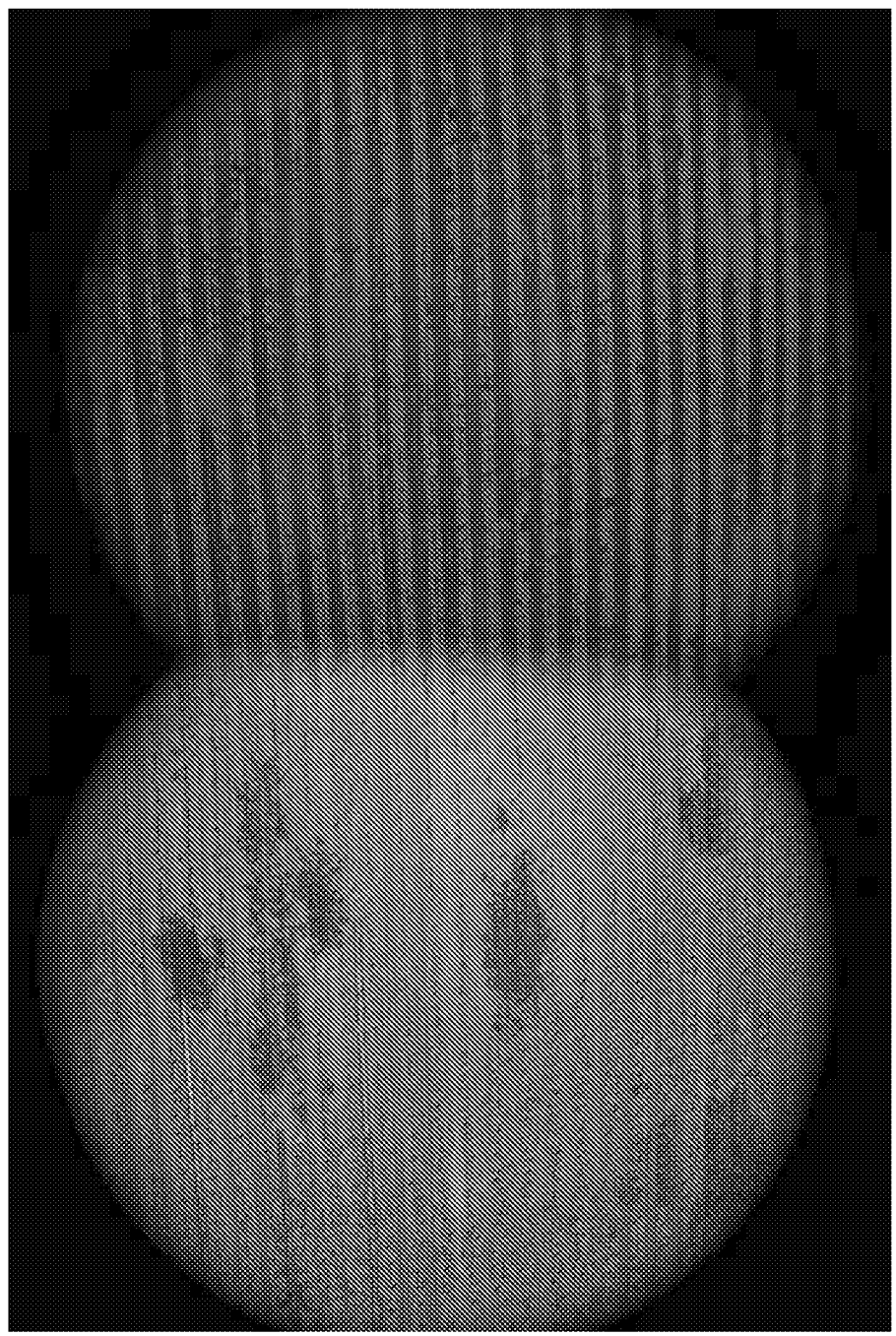
FIG. 2a shows a pair of Visible and NIR images of a given plantation field.
Figure 2B:
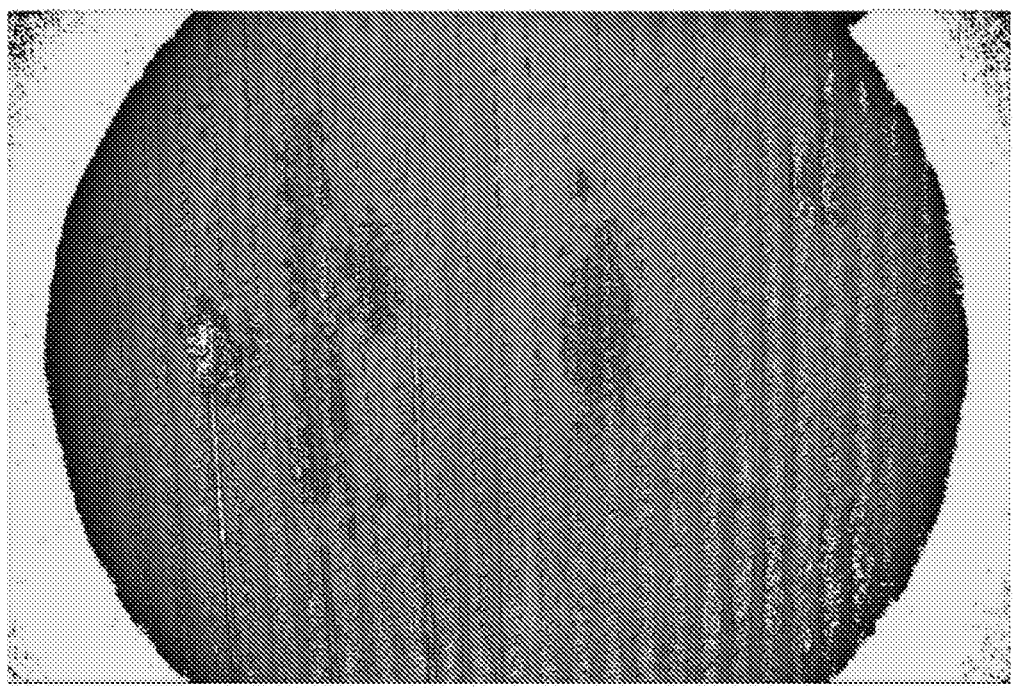
Figure 2C:
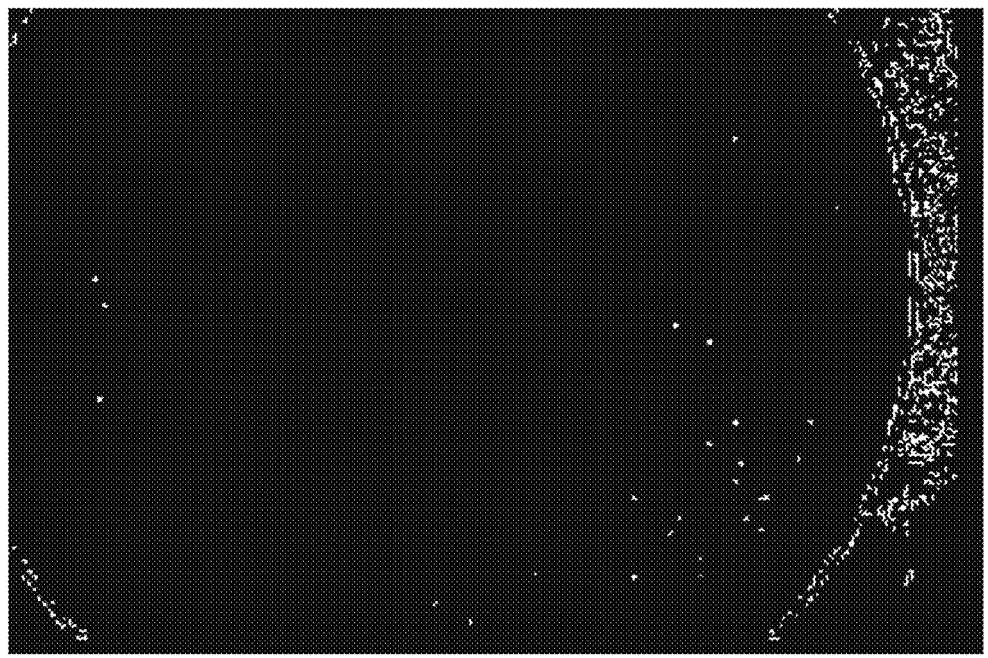
FIG. 2c shows a set of points associated with polygons having the highest density values from FIG. 2b.
Figure 2C:
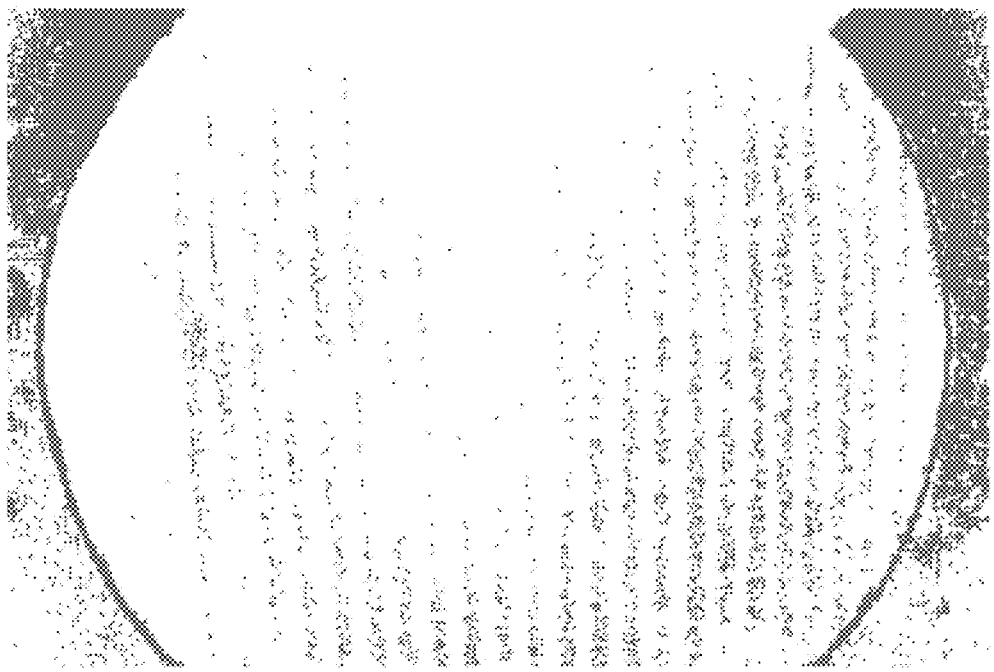

FIGS. 2a, 2b and 2c show how this procedure works. FIG. 2a shows a pair of Visible and NIR images of a given plantation field. FIG. 2b shows pixels associated with NDVI values ranging from 0.75 to 0.9 (the pre-defined range of interest) derived from the images of FIG. 2a. FIG. 2c shows a set of points (marked in white color) associated with polygons (actually blocks of size 4×4) having the highest density values. The red points of the left image depict the set of all pixels whose NDVI values range between 0.75 and 0.9.

Figure 11:
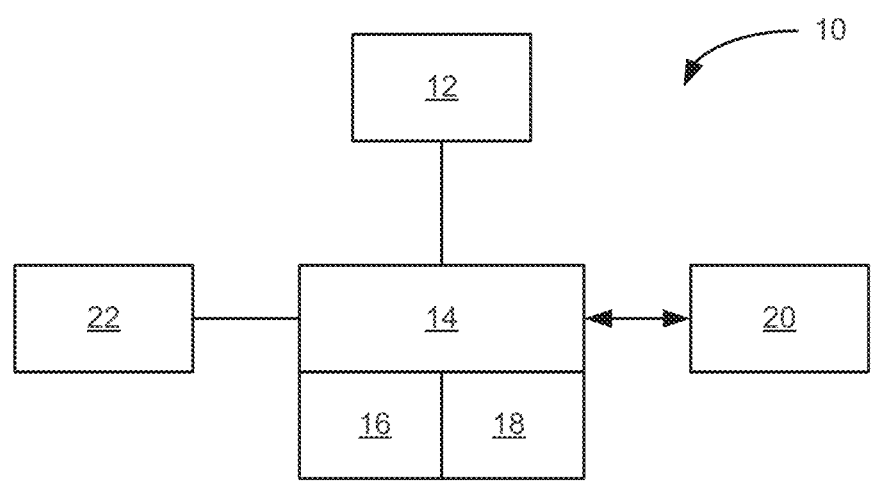
FIG. 11 is a block diagram illustration of a system constructed and operative in accordance with embodiments of the present invention.

The method described above can be implemented by a system 10 for multi-spectral imagery acquisition and analysis illustrated schematically in FIG. 11. The system 10 includes at least one multi-spectral image capturing device 12 and a processor 14 coupled to the image capturing device 12. Preferably, the processor is in two way communication with a user 20 for exchanging data and instructions. The processor runs an image processing module 16 including a blob partitioning module 18 to automatically analyze captured images by blob partitioning according to predefined survey parameters and provide output corresponding to irregularities on each image falling within the predefined survey parameters. As described above, this output can be used by the processor 14 or provided to the user 20. The blob partitioning module 18 can implement both large scale blob partitioning and small scale blob partitioning. The system further includes a geographical location indicator 22 adapted and configured to provide an indication of a geographical location of the irregularities. While geographical location indicator 22 is illustrated in this embodiment as being a separate unit, according to other embodiments of the invention, it can be part of the image capturing device 12. The processor is further configured to determine automatically whether to direct one of the multi-spectral image capturing devices to the indicated geographical location to capture images of the irregularities in response to the output.

The present invention also relates to a method for identifying objects in multi-spectral images. The method includes analyzing high resolution multi-spectral images according to pre-defined object parameters and, when parameters within the pre-defined object parameters are found, performing blob partitioning on the images containing such parameters to identify blobs. Objects confined to these blobs are compared to pre-defined reference parameters to identify objects having the pre-defined object parameters. According to some embodiments, the objects are classified before comparing. A number of non-limiting examples of use of this method are as follows.

Automated Identification of Simple Morphology Objects

Some objects selected for identification possess the property of having very simple morphology (form and structure) (hereinafter "SMS"—Simple Morphology Structure), typically in a shape of a small stain. One useful approach to detecting SMS objects entails calculation of the set of very small blobs (1 to 15 pixels), extraction of a small image around each small blob, and searching for the selected object in this image. Typically, such search will involve activating an internal pattern matching program between the small blobs and reference patterns.

One important implementation of detecting SMS objects is its application to small pest detection. Pests' SMS images typically exhibit a shape of a "small stain", whose boundaries can be approximated by an ellipse shape.

Computerized identification of SMS pests in infected areas is based on the following observational assumptions:
a. Images of SMS are geometrically significant, possessing an ellipse-like shape and, usually, the color contrast of an SMS pest with respect to its surroundings is very sharp.
b. The visual morphology of an infected plant containing a high concentration of "stains"—SMS pests—in comparison to a non-infected plant. Thus, an infected plant could be distinguished from a non-infected plant by comparing the "concentration of stains" in a suitable image processing tool.

The current invention employs methods for automatic detection of SMS pests based on transforming the observational assumptions described above into effective algorithms.

In one algorithmic embodiment of these observations, the acquired image (in Visible or NIR or NDVI image, or any kind of channel separation like CMYK (cyan, magenta, yellow and black) is first converted to a gray level image and then undergoes a gray level blob-based partitioning. Depending on the quality of the image, effective blob partitioning typically will entail a uniform quantization operation. 32 values of gray levels usually suffice for most applications. The binary map of each of the gray level values is subject to the Hoshen-Kopelman cluster labeling algorithm described above, and finally the set of all possible blobs consisting of all gray level values is created and stored.

From this set of calculated blobs, only small blobs having a size of smaller than a small threshold number of pixels (typically, but not limited to, having a size smaller than 10 pixels) are extracted.

The image is partitioned to several, equal size sub-images. In each sub-image, the number of small blobs created by the method described above is counted. A detection of the presence of SMS pests is declared if the number of small blobs in a given percentage of the sub-images exceeds a pre-defined calibrated threshold value. Such threshold setting can be set to match agricultural spraying policies.

In another algorithmic embodiment of this invention, the image is converted to a gray level image and undergoes a gray level blob partition using the same method described above. From the set of partitioned blobs, blobs having very small size, (typically but not limited to having a size of less than 10 pixels) are selected and their gravity centers are registered.

Figure 3B:
FIGS. 3a and 3b illustrate a method where a detection is declared, according to one embodiment of the invention.
Figure 3A:

All sub images around each registered gravity center (having a radius length set to, typically, but not limited to, less than 50 pixels) are extracted and are compared to reference images of SMS pests, typically having an elliptical form, residing in the memory, using a correlation operator or a pre-programmed deep neural network classifier function. If the correlation exceeds a preset threshold value, and/or successful classification is flagged, a detection is declared. FIGS. 3a and 3b demonstrate how this method works. The two gray level images depict an infected cotton field. The set of red points superimposed on the image in FIG. 3a shows the gravity centers of all small blobs whose number of pixels is less than 50, as calculated by the method described above. In this example, the gray level image was reduced to 32 levels. Small images of 16×16 pixels size around each of these points were extracted and were subject to matching against reference images using a correlation operator. The set of red points superimposed on the image in FIG. 3b shows all the sub images that the correlation operator found.

In another algorithmic embodiment of the analysis, the selection of small blobs is confined to the set of blobs having a color that stands within a close distance to a reference color that typically characterizes the SMS pests in the query. In the current invention, the distance between two given RGB colors is defined as follows:

If $X1=\{R1,G1,B1\}$ and $X2=\{R2,G2,B2\}$

Then $$\text{Distance}[X1,X2]=\text{Max}\{\text{Abs}[R1-R2], \text{Abs}[G1-G2], \text{Abs}[B1-B2]\};$$

Figure 4A:
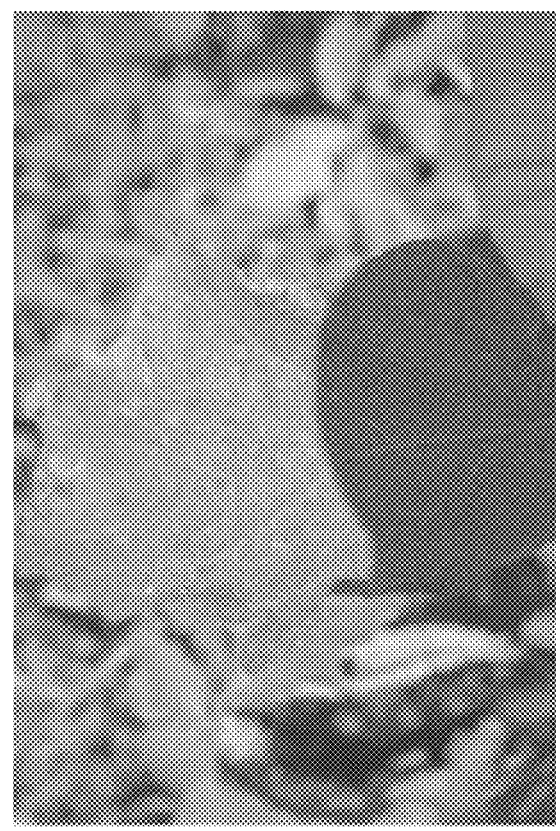
FIGS. 4a and 4b show a set of detected SMS pests resulting from extracting small blobs whose colors are confined to a distance "close" to the white color.
Figure 4B:
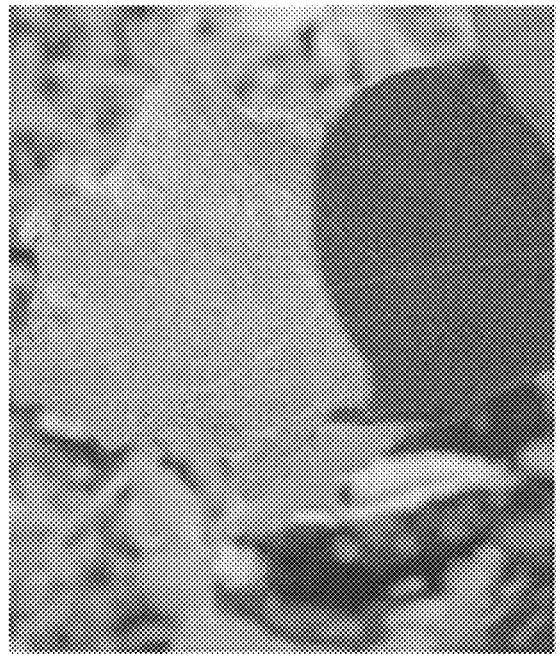

FIGS. 4a and 4b shows the way this procedure works. FIG. 4a shows a leaf containing a set of SMS pests (white color). FIG. 4b shows a set of detected SMS pests (indicated by purple points superimposed on the image of FIG. 4a) resulting from extracting small blobs whose colors are confined to a distance "close" in the sense defined above, (in this example, less than 40 color units) to the white color. It will be appreciated that the color selected to indicate the pests in the display is meaningless, in itself, and the display can be any selected color.

In another algorithmic embodiment of the analysis, the detection of SMS pests is carried out using the following method. An acquired gray-level image of the Visible image is partitioned into several, for example, four, very similar non-overlapping images, by forming a row wise and column wise interlacing operator, resulting in forming four sub images whose union accurately spans the original image. Herein, it is assumed that the original gray level image is marked as X, and X1, X2, X3 and X4 are the resulting sub images due to the application of the interlacing operator.

Figure 5A:
FIGS. 5a and 5b illustrate a high correlation, flagging the presence SMS pests.
Figure 5B:

Defining the image A ("acceleration image of X") as: $A=(X1+X4-2*X3)$; will result in an image A that enhances contrasts. It is claimed that extracting from A a set of a pre-selected number of pixels having the highest brightness values yields a set of pixels that has a very high probability to include SMS pests. Small sub images around the set of calculated high value pixels are extracted and their content is compared to reference SMS pests' images residing in the memory. A high correlation will flag the presence SMS pests. FIGS. 5a and 5b illustrate this idea. FIG. 5a shows an infected leaf containing SMS pests and FIG. 5b shows a set of red points, superimposed on FIG. 5a. The red points are the points created by the method described above, for which the correlator identified their corresponding extracted small sub images as containing an SMS pest.

In another embodiment of above algorithmic idea, detection of SMS pests is carried out using the following method. The gray level of the Visible or the NIR images undergoes an edge detection operator. From the resulting edge detected image, a set of pixels whose intensity values exceed a given threshold value is selected.

Figure 6C:
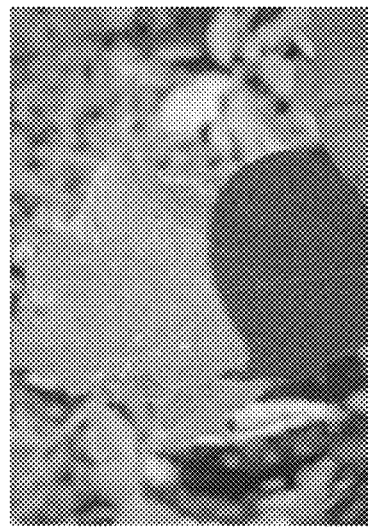
FIGS. 6a, 6b and 6c illustrate flagging of pest detection when the correlation measure exceeds a pre designed threshold value.
Figure 6B:
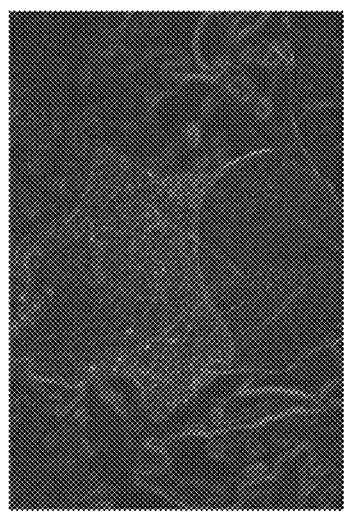
Figure 6A:
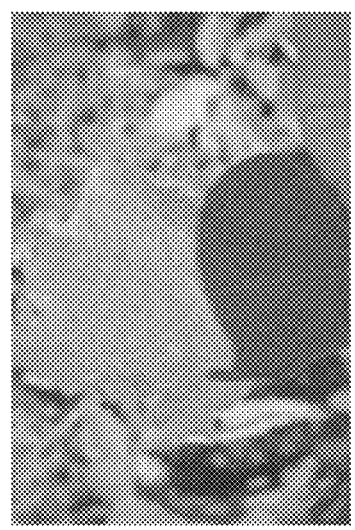

Small sub images around these pixels are extracted and their content are compared against known reference images using a correlation method. If the correlation measure exceeds a pre designed threshold value, pest detection is flagged. FIGS. 6a, 6b and 6c demonstrate the idea. FIG. 6a shows a leaf containing SMS pests (colored in white), FIG. 6b shows an edge detection application of FIG. 6a and FIG. 6c shows a set of points (yellow) superimposed on FIG. 6a which is the result of extracting the relevant points from FIG. 6b in accordance with the method described.

In another embodiment of the above algorithmic idea, the detection of SMS pests is carried out using the following method. The gray level of the Visible or the NIR images undergoes a binary threshold operation. The threshold level is calculated as follows: starting with a very high threshold (dark frame), the threshold level is gradually decreased so that, if the number of white points (resulting from the threshold operation) exceeds given a level, a desired threshold is declared.

From the resulting image, a set of pixels whose intensity values exceed the above desired threshold value is selected. Small sub images around these pixels are extracted and their content are compared against known reference images using a correlation method. If the correlation measure exceeds a pre designed threshold value, pest detection is flagged.

Automated Identification of Complex Morphology Objects

Some objects whose identification is required possess the property of having a complex structure (here after CMS). A general approach for detecting CMS objects entails partitioning the image into blobs having moderate size, depending on the specific required object morphology. It is claimed that, if CMS objects are present in the acquired image, they are very likely to be found in several images surrounding such moderate sized blobs, typically by transmitting these rather small images (usually confined only to few dozens of pixels) to a remote server for identification, preferably, but not limited to, using a deep neural network approach. Another identification option is to activate an internal code (such as described below) capable of identifying the object.

A number of CMS pest identification methods will now be described.

Examples of CMS pests are fly, grasshopper, insects, etc. Observing the structures of these pests shows very complicated morphology whose detection usually calls for a sophisticated matching code.

In one embodiment of the pests CMS detection method, the acquired image (optionally VISIBLE and/or NIR and/or NDVI and/or other vegetation index based image) first undergoes gray level conversion and histogram equalization. The image then undergoes blob partitioning using the Hoshen Kopelman cluster labeling approach described above.

Blobs having a moderate to high number of pixels are selected and sub images surrounding the gravity centers of these blobs having a radius less than a given level (typically, but not limited to, 32 pixels) are extracted.

Each of the selected sub images undergoes further blob partition, preferably using 4 gray level values. Alternatively, a different number of intensity values can be utilized. The calculated blobs are arranged with respect to their size in pixels. A selected number, for example, the first three large blobs, are extracted and a binary image comprising their associated pixels is created. In case a pest is "captured" in the above extracted sub image, and for the purpose of delineating the morphology boundaries, two morphology binary operators are applied on the binary map comprising the large blobs: the binary dilate operator and the binary erode operator. Finally, the difference between the dilated and the eroded images is calculated, resulting in an image that approximately captures the boundaries of the pest morphology.

FIGS. 7a, 7b and 7c demonstrate how the algorithm works. Each images in FIG. 7a shows an original CMS pest. Each image in FIG. 7b shows a binary image resulting from the projection of the pixels of the largest three blobs of the corresponding image in FIG. 7a. And each image in FIG. 7c shows the resulting boundaries of the corresponding pest of FIG. 7a after application of the binary erode and dilate operators. The resulting images in FIG. 7c are then compared to similar type images, e.g., CMS pest boundaries, using a correlation procedure and/or classification procedure using a deep neural network or other machine vision method, such as predictor and classifier.

In another embodiment of a blob partition CMS-based detection method, the gray level of the Visible image or the NIR image or the NDVI or other vegetation index based image undergoes blob partition (preferably, but not limited to, 4 intensity levels) and blobs having a selected pixels size, for example, ranging from 50 to 300 pixels numbers, are extracted. The image surrounding each such blob is extracted and is sent to a remote server for classification to the right category of CMS pests using a deep neural network approach, or other machine vision method, such as predictor and classifier, compared against a large data set of pest images that were used as a training set for pest classification.

Figure 8A:
FIGS. 8a and 8b illustrate a blob partition CMS-based detection method.
Figure 8B:
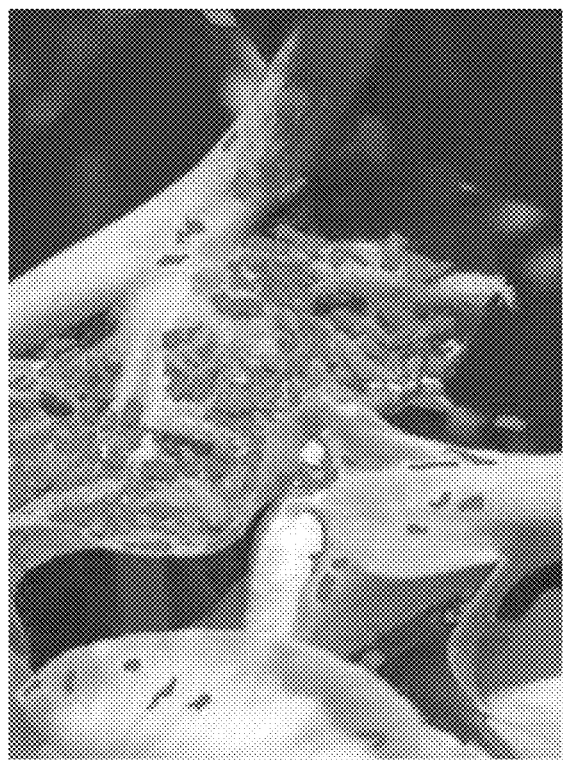

FIGS. 8a and 8b illustrate this concept. FIG. 8a depicts a leaf infected with CMS aphids, and FIG. 8b shows a set of blobs whose sizes range between 100 and 200 pixels. The match between pests and extracted blobs is significant.

Automated Indirect Identification of Objects

In some cases, in particular in the case of automatic pest identification, the presence of a pest can be detected by its unique impact on its surroundings. In other words, it may be difficult or impossible to capture the actual pest in the acquired images, but the presence of the pest can be deduced from the state of the plant. Two such cases, out of many such situations, are presented below by way of non-limiting example only.

The pest known as "Citrus Leafminer" can serve as one good example. The presence of "winding" mines, attributed to this pest, are usually found in the leaf surface. Thus, the detection of such mine manifests the presence of this pest. The present invention presents two algorithmic methods to identify this pest:

A. Using the method for automated identification of Complex Morphological Structure, as described in the previous section, where images around blobs having a relatively large number of pixels (typically between 100 and 700) are extracted and the content of this image is compared to various reference images containing the Citrus Leafminer.

B. A specific Leafminer tailor-made detection algorithm is described as follows: Images of blobs having a relatively large number of pixels are extracted. The boundaries of likely objects residing in these images are calculated. On any such image, an Image Corner Filter is applied and the number of calculated corner coordinates is counted. If the number of corner coordinates exceeds a given threshold a detection of Citrus Leafminer is declared.

Figure 9A:
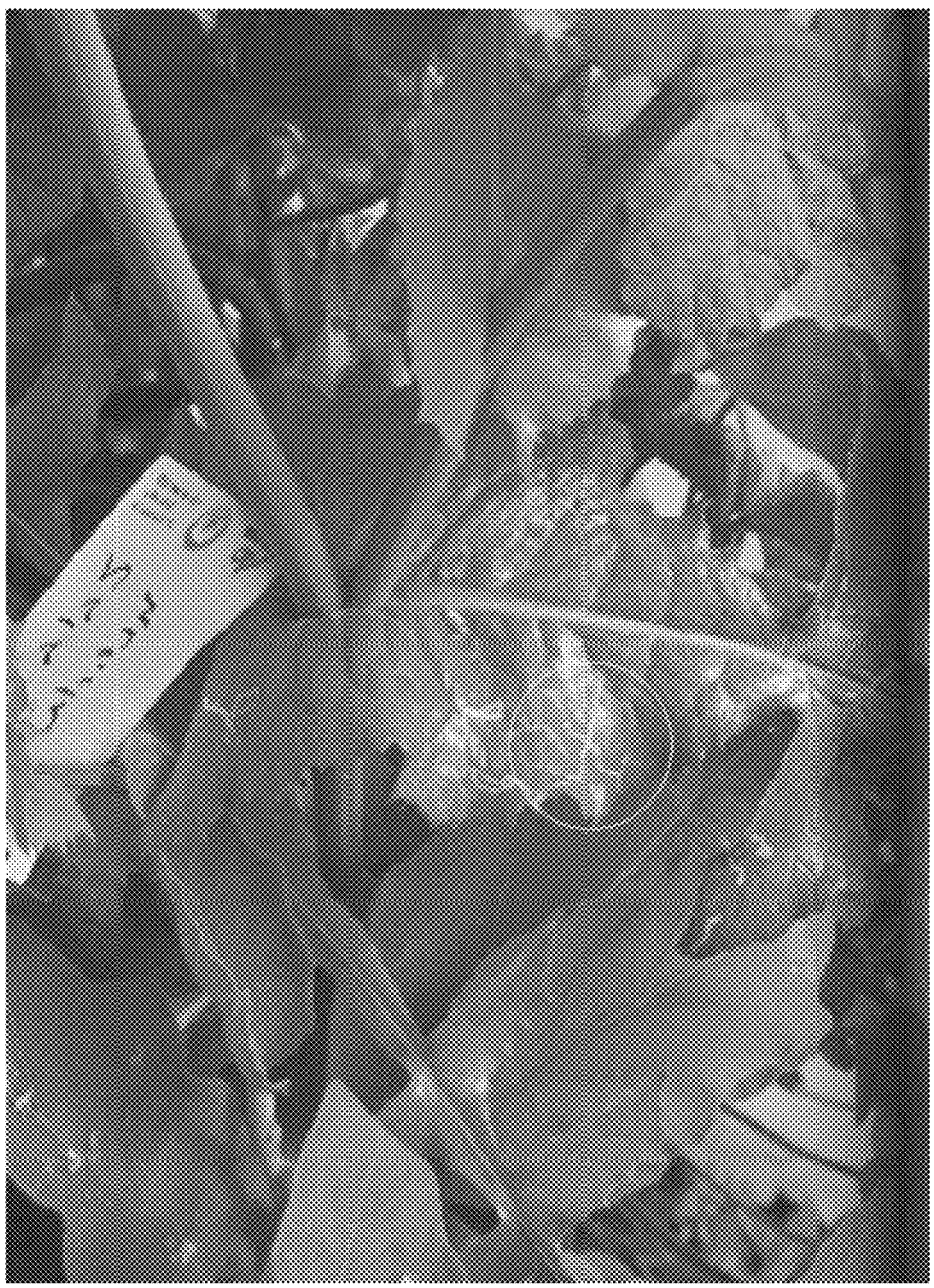
FIG. 9a shows a typical mine of a Citrus Leafminer.
Figure 9B:
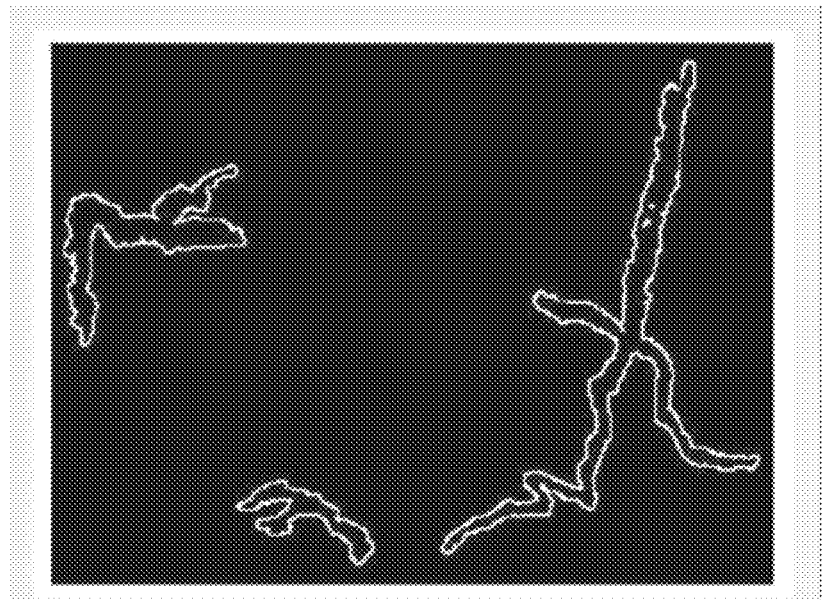
Figure 9C:
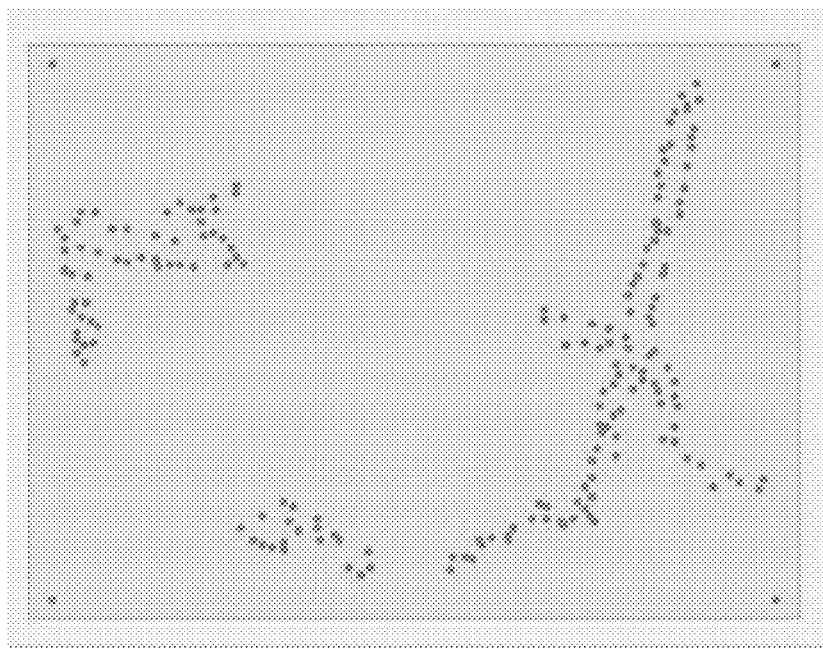

FIGS. 9a, 9b and 9c demonstrate the idea: FIG. 9a shows a typical mine of the Citrus Leafminer (encircled with yellow color) and FIG. 9b shows its boundaries and FIG. 9c shows the resultant corner points, resulting from application of the Corner Filter (bottom figure). Clearly there are a relatively large number of such points, indicating the presence of a mine.

It will be appreciated that the appearance of an object relative to its background is different when viewed in different spectral bands. According to embodiments of the present invention, this fact can be utilized to improve the isolation and identification of various objects of interest. For example, the high resolution multi-spectral image may first undergo color manipulation to strengthen and isolate the sought object's appearance from the rest of the objects of the image. These manipulations can include combining some of the original multi-spectral visual bands and some channels from the CMYK (Cyan Magenta Yellow Key (Black)) Color space and/or HLS (Hue Lightness Saturation) Color space and/or any other color space or spaces. The usage of multi-spectral, narrow bands in this invention in various combinations between individual bands from the RGB color space, CMYK color space, the HSL color space and possibly other color spaces, enables improved separation of the searched object from its surrounding background.

After the distinctiveness of the appearance of the disease or other object is examined in the various color channels and matrices, the arithmetical calculation which enhances this appearance is chosen. Such combinations of bands can be realized using various image processing tools, such as Image Difference, Add<Subtract, Lightest/Darkest pixels, image adjust, etc. The combination can be between two channels/ matrices or more, according to the appearance of the object in the different matrices. This gives a much better object separation from the background color than by using just the RGB color space. A further separation of the searched object, in general, can be achieved by also incorporating the specific 650 nm Red band of the multi-spectral spectrum. In this case, a pronounced white color indicates the detection of the object. Performing cross detection of various color combinations may improve the detection. Various color combinations as described above, can be pre-selected and tailored to specific kinds of pests, thus increasing the chances of the pest detection.

Another important example of automated indirect pest identification, according to these embodiments of the invention, is hereby presented with reference to the blight phenomena. Blight refers to symptoms affecting plants in response to infection by a pathogenic organism. It is typically associated with a brown color and a dry leaf. According to the present invention, an automatic search for blight is carried out using the acquired high resolution multispectral image. The acquired image first undergoes color manipulation, as described above, to strengthen and isolate the blight's appearance from the other objects of the image. The usage of various combinations between individual narrow bands from the RGB color space, CMYK color space, the HSL color space and possibly other color spaces, enables a substantial separation of blight infected leaves from their surrounding background. This is typically the green part of the leaf or the brown color of the soil.

Figure 10:
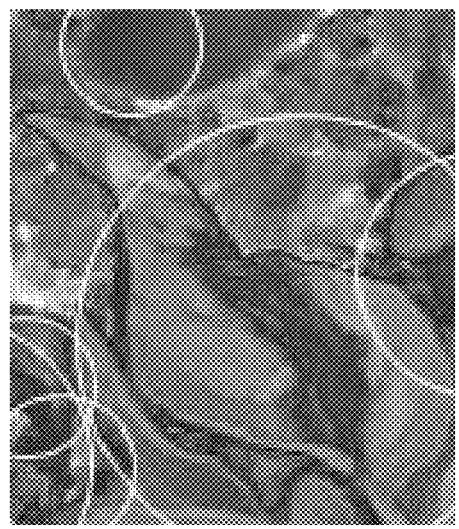
FIG. 10 illustrates use of color manipulation to strengthen the colors in the plant that are associated with blight.

Successful color manipulation typically exhibits the blight part very clearly, usually with two (or more) pronounced dominant colors. For convenience, these are termed the principal color and the secondary color. These color values depend on the specific color manipulation performed. FIG. 10 illustrates this example. Here the color manipulation consisted of taking the image difference between the visual image composed of the RGB channels and the magenta channel associated with the CMYK color of the image. The leaf at the center clearly shows two colors—brown and purple. The automatic blight detection algorithm first extracts all pixels associated with the principal color and applies a blob partition on this set. Blobs possessing pixels associated with the secondary color in their immediate vicinity are declared as associated with blight.

While this principle of color manipulation has been exemplified above with reference to blight, it will be appreciated that it can be utilized in many different applications, whether searching for different types of pests or diseases or monitoring totally different objects. The important steps are capturing multi-spectral images and, after blob partitioning, performing division of the images to various color spaces and crossing selected color channels to cause the sought objects to stand out from the remainder of the image.

It will be appreciated that, while the present invention has been exemplified above with regard to agricultural surveys, it is also applicable to many other situations wherein it is necessary to scan an area on land or in the sea in order to detect local irregularities for further investigation, for example, searching for schools of fish or land mines or other surface irregularities on the ground.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

REFERENCES

J. Hoshen and R. Kopelman (1976). "Percolation and Cluster Distribution". Phys. Rev. B. 1(14): 3438-3445
http://jpe.oxfordjournals.org/content/1/1/9.full
Remote Sensing Imagery in Vegetation Mapping: a Review
Reference to the US Department of Agriculture regarding remote sensing and spectral bands.
www.mdpi.com%2F2072-4292%2F6%2F6%2F5257%2Fpdf&usg=AFQjCNErQYE2iPKfPKwtJYLnXLB0jWN5KA&sig2=9bMbgRXFMNgmqMIrr2TWqA An Airborne Multi-spectral Imaging System Based on Two Consumer-Grade Cameras for Agricultural Remote Sensing "Systematic biology (hereafter called simply systematics) (a) provides scientific names for organisms, (b) describes them, (c) preserves collections of them, (d) provides classifications for the organisms, keys for their identification, and data on their distributions, (e) investigates their evolutionary histories, and (f) considers their environmental adaptations." ***

*** Wikipedia—Systematics

UAV imagery, as described by the US DOA uses at best only a pixel per 0.1 m (10 cm), which is ×12.5 lower resolution than the scenario described above, while a use of a 50 mm lens in the aforementioned scenario, will result in three meters altitude in ×50 resolution compared to the best resolution of the DOA research—over 100 pixels per square centimeter!

Sensing Fields in this Kind of Resolution Allows the Identification of the Pest Type, and Even Remote Differentiation Between Aphids and Flies.

Chambolle, A. (2004). "An algorithm for total variation minimization and applications". Journal of Mathematical Imaging and Vision. 20: 89-97.

The invention claimed is:

1. A method for multi-spectral imagery acquisition and analysis, the method comprising:
   capturing multi-spectral aerial images according to pre-defined survey parameters at a pre-selected resolution;
   automatically performing preliminary analysis of the captured images according to the pre-determined survey parameters and using large scale blob partitioning of the captured images containing such survey parameters in real or near real time;
   detecting irregularities in the analyzed image data according to the pre-defined survey parameters and providing an output corresponding thereto;
   associating GPS data with the detected irregularities; and
   determining, from said output, whether to perform a second stage of image acquisition at a higher resolution than said pre-selected resolution and analysis using small scale blob partitioning.

2. The method according to claim 1, further comprising:
   directing an image acquisition device, to capture additional multi-spectral images of at least one of said detected irregularities at higher resolution than said pre-selected resolution using said associated GPS data; and
   performing analysis using small scale blob partitioning of the additional multi-spectral images in real or near real time.

3. The method according to claim 2, wherein the step of directing includes automatically directing the image acquisition device.

4. The method according to claim 2, further comprising: comparing morphology of at least one of said detected irregularities with morphology of known objects.

5. The method according to claim 2, wherein the small scale blob partitioning is performed according to pre-defined object parameters such that when parameters within the pre-defined object parameters are found, performing blob partitioning on said images containing such parameters identifies blobs; and further comprising:

comparing objects confined to said blobs to pre-defined reference parameters to identify objects having said object parameters.

6. The method according to claim 5, further comprising classifying said objects before the step of comparing.

7. The method according to claim 5, further comprising:

partitioning the acquired higher resolution images into a confined size sub-images set according to a large scale or a small scale survey, matching an image size to that of the blobs; and identifying the objects within the set of sub-images by either one of:

sending the set of these sub-images to a remote server for identification; or identifying the object on the spot by activating a local identification code.

8. The method according to claim 5, further comprising activating an internal pattern matching program between the blobs and reference patterns in order to detect a selected Simple Morphology Structure (SMS) object in the higher resolution image.

9. The method according to claim 5, further comprising:

converting the higher resolution image to a gray level image that undergoes a gray level blob-based partitioning;

a binary map of each of the gray level values is subject to a Hoshen-Kopelman cluster labeling algorithm and a set of all possible blobs consisting of all gray level values is created and stored;

extracting, from this set of calculated blobs, only small blobs having a size of smaller than a predefined threshold number of pixels;

partitioning the image to several, equal size sub-images;

counting a number of small blobs in each sub-image; and declaring detection of the presence of Simple Morphology Structure pests when a number of small blobs in a given percentage of the sub-images exceeds a pre-defined calibrated threshold value.

10. The method according to claim 5, further comprising:

converting the higher resolution image to a gray level image that undergoes a gray level blob partition;

selecting, from the set of partitioned blobs, blobs having predefined very small size and registering their gravity centers;

extracting sub images around each registered gravity center; and comparing the extracted sub images to reference images of Simple Morphology Structure pests, using a machine vision method; and declaring detection of Simple Morphology Structure pests when the correlation exceeds a preset threshold value, and/or successful classification is flagged.

11. The method according to claim 5, further comprising:

performing blob partitioning on the higher resolution multi-spectral images;

selecting small blobs having a color that stands within a close distance to a pre-selected reference color that typically characterizes the Simple Morphology Structure pests, where the distance between two given RGB colors is defined as follows:

If $X1=\{R1,G1,B1\}$ and $X2=\{R2,G2,B2\}$

Then $Distance[X1,X2]=Max\{Abs[R1-R2], Abs[G1-G2], Abs[B1-B2]\}$.

12. The method according to claim 5, further comprising:

partitioning an acquired gray-level image X of a Visible image into several very similar non-overlapping images, by forming a row wise and column wise interlacing operator, resulting in forming four sub images X1, X2, X3 and X4 whose union accurately spans the original image;

defining image A as an acceleration image of X: $A=(X1+X4-2*X3)$; will result in an image A that enhances contrasts;

extracting from A a set of a pre-selected number of pixels having the highest brightness value to yield a set of pixels;

extracting small sub images around the set of calculated high value pixels;

comparing their content to reference Simple Morphology Structure pests' images residing in a memory; and flagging presence of Simple Morphology Structure pests when there is a high correlation.

13. The method according to claim 5, further comprising:

converting a Visible or NIR image to a gray scale image;

causing the gray level of the images to undergo an edge detection operator;

from the resulting edge detected image, a set of pixels whose intensity values exceed a given threshold value is selected;

extracting small sub images around these pixels;

comparing content of said sub images against known reference images using a correlation method; and flagging pest detection if the correlation measure exceeds a pre designed threshold value.

14. The method according to claim 5, further comprising:

performing a binary threshold operation on a gray level image of a Visible or NIR image;

from the resulting image, selecting a set of pixels whose intensity values exceed a predefined threshold value;

extracting small sub images around these pixels;

comparing content of the extracted small sub images against known reference images using a correlation method; and flagging Simple Morphology Structure pest detection when a correlation measure exceeds a pre designed threshold value.

15. The method according to claim 5, further comprising:

performing gray level conversion and histogram equalization on an acquired image;

performing blob partitioning on the gray level image;

selecting blobs having a moderate to high number of pixels and extracting sub images surrounding the gravity centers of these blobs having a radius less than a preselected size;

performing further blob partition on each of the selected sub images; arranging the calculated blobs with respect to their size in pixels;

extracting a selected number of large blobs and creating a binary image comprising their associated pixels;

in case a Complex Morphology Structure pest is "captured" in the extracted sub image, two morphology binary operators are applied on the binary map comprising the large blobs: a binary dilate operator and a binary erode operator;

calculating a difference between the dilated and the eroded images, resulting in an image that approximately captures boundaries of a pest morphology; and comparing the calculated boundaries with stored reference images of CMS pest boundaries.

16. The method according to claim 5, further comprising:

converting a Visible image or a NIR image to a gray level image;

performing blob partition on the gray level image;

extracting blobs having a selected pixels size;

extracting an image surrounding each such blob; and classifying each such image in a remote server to a category of CMS pests using a machine vision method.

17. The method according to claim 5, further comprising:

extracting images of blobs having a relatively large number of pixels;

calculating boundaries of likely objects residing in the extracted images;

applying an Image Corner Filter On each such image, counting a number of calculated corner coordinates; and if the calculated number of corner coordinates exceeds a given threshold a detection of Citrus Leafminer is declared by indirect identification.

18. The method according to claim 5, further comprising:

performing color manipulation on multi-spectral images of a plant to strengthen colors in the plant that are associated with blight;

performing blob partitions to a set of all pixels in the image associated with a principal dominant color, using a pre-defined tolerance;

seeking a match for the detected principal color blobs with pixels associated with a secondary dominant color in the immediate vicinity of that blob;

declaring a blight leaf when such a match is found.

19. The method according to claim 5, further comprising:

performing color manipulation on a high resolution multi-spectral image to strengthen and isolate an object's appearance from other objects in the image;

performing blob partitioning on the manipulated image;

dividing the images to color channels according to at least two color spaces; and combining selected color channels from the at least two color spaces to enhance the object's appearance.

20. The method according to claim 19, further comprising performing cross detection of various color combinations to improve object separation from the background color.

21. The method according to claim 19, wherein the step of combining further includes incorporating the 650 nm red band of the multi-spectral spectrum.

22. The method according to claim 1, wherein said step of determining is performed automatically.

23. The method according to claim 1, wherein the step of determining includes:

constructing a binary map of the image, where pixels associated with predefined range of parameter values is set to 1 and the rest of the pixels is set to 0;

constructing a set of all possible blobs associated with the binary map by raster scanning the binary map, finds blobs along the scanning process and assigning them with a running index;

defining a group of blobs as an irregularity when:

a. a number of pixels belonging to a given single blob exceeds a predefined threshold parameter; or b. a number of pixels belonging to a set of blobs, all confined to a given radius (from a gravity center of the set of blobs), exceeds a predefined threshold.

24. The method according to claim 1, wherein said multi-spectral images include at least two images selected from the group including visible and NIR images.

25. A system for multi-spectral imagery acquisition and analysis, the system comprising:

at least one multi-spectral image capturing device;

a processor coupled to the image capturing device;

the processor running an image processing module including a blob partitioning module to automatically analyze captured images by blob partitioning according to predefined survey parameters and provide output corresponding to irregularities on each image falling within said predefined survey parameters;

wherein the blob partitioning module is operative to implement both large scale blob partitioning and small scale blob partitioning and a geographical location indicator adapted and configured to provide an indication of a geographical location of the irregularities;

the processor being configured to automatically determine whether to direct one of the at least one multi-spectral image capturing devices to said indicated geographical location to capture images of said irregularities in response to said output.

26. The system according to claim 25, wherein the processor is in two way communication with a user for exchanging data and instructions.

* * * * *